United States Patent [19]
Ferguson

[11] 3,798,826
[45] Mar. 26, 1974

[54] COMPOSITE FISHING TACKLE PAIL

[76] Inventor: Richard E. Ferguson, 2722 N. 48th St., Milwaukee, Wis. 53210

[22] Filed: Sept. 5, 1972

[21] Appl. No.: 286,419

[52] U.S. Cl. ............................ 43/54.5 R, 43/57.5 R
[51] Int. Cl. ....................... A01k 97/00, A01k 97/06
[58] Field of Search ..................... 43/57.5 R, 54.5 R

[56] References Cited
UNITED STATES PATENTS

| | | | |
|---|---|---|---|
| 2,813,368 | 11/1957 | Knowles | 43/57.5 R |
| 3,022,600 | 2/1962 | Glascoff | 43/57.5 R |
| 3,180,053 | 4/1965 | Norton et al. | 43/57.5 R |
| 3,378,134 | 4/1968 | Wilkinson et al. | 43/54.5 R X |

Primary Examiner—Louis G. Mancene
Assistant Examiner—Daniel J. Leach
Attorney, Agent, or Firm—Gerald P. Welch

[57] ABSTRACT

Composite fishing pails including an outer base pail, an intermediate pail having a vertical wall with triple horizontal aperture rows for disposing fish lures and flies inside and outside of said vertical wall, and a central pail for a spool of fishline, the latter being led for unwinding through a combination spout and handle.

5 Claims, 3 Drawing Figures

PATENTED MAR 26 1974 3,798,826

COMPOSITE FISHING TACKLE PAIL

BRIEF SUMMARY OF THE INVENTION

Fishing lures and flies are usually kept by the user in a conventional box with the result that the attached hooks and hook gangs lead to considerable entanglement. In view of this problem the present invention is comprised of three separate pail containers depending on each other for mutual usefulness and designed to eliminate the problem of entanglement.

An outer pail provided with a conventional bail is used to carry the other two containers. An intermediate pail has a cylindrical vertical wall provided with three spaced horizontal rows of apertures. The apertures are shaped to permit engagement of lure hooks therein as well as fly hooks, and the flies and hooks may be hung inside and outside of the intermediate pail. The intermediate pail is provided at the top with a bail whereby the same may be retrieved from the carrying pail for selection of a lure or fly or for return of these accessories. The innermost pail has at the upper edge thereof an inwardly and upwardly curved spout which serves as a handle and also a means for withdrawing a line from a spool of fish line resting in the bottom of said central pail. A resilient means on the upper end of the spout retains the free end of the line for convenient retrieval and transfer to a fishing rod or pole as it is needed.

BRIEF DESCRIPTION OF THE DRAWING

FIG. 2 is a similar view of the intermediate pail provided with apertures for storing fish lures and the like.

DETAILED DESCRIPTION

Figure 1:
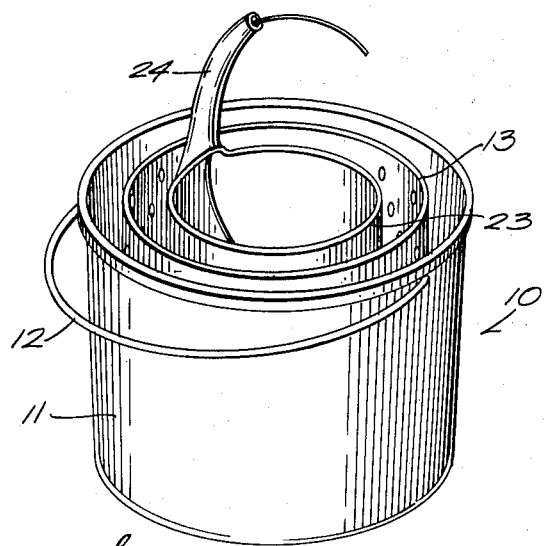
FIG. 1 is a view in perspective from above of a fishing pail assembly embodying the invention.
Figure 2:
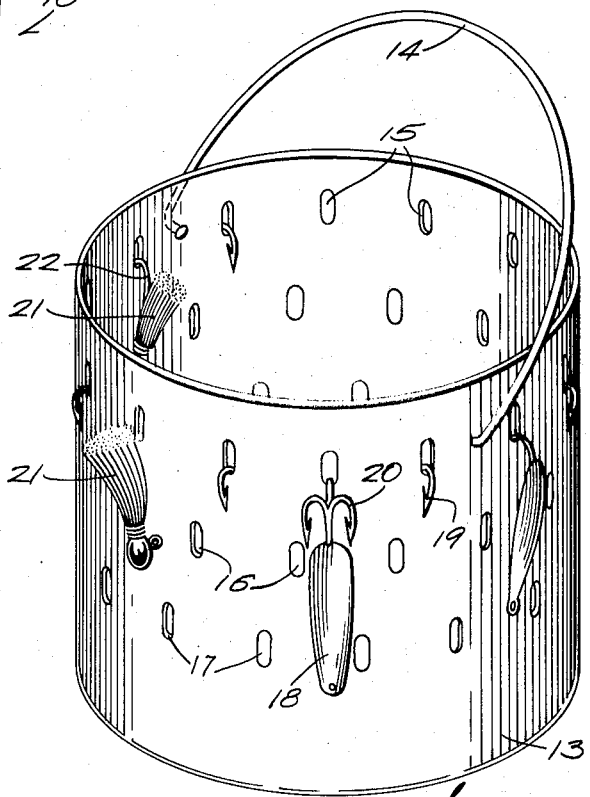
Figure 3:
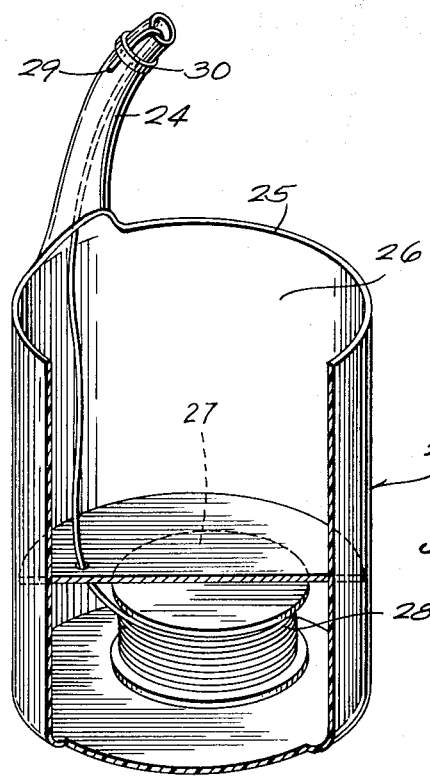
FIG. 3 is view partly in perspective and partly in vertical section of the innermost pail provided for the spool of line.

The composite fishing tackle pail 10 has a base pail 11 as a container for the other parts of the assembly, the said pail 11 being provided with a carrying bail 12. An intermediate pail 13 has a bail 14 for withdrawal and replacement thereof within the pail 11. Pail 13 has three horizontal rows of apertures as at 15, 16 and 17 to permit storage of lures 18 by means of a hook 19 or gang hooks 20 inserted in the said apertures either within or outside of intermediate pail 13, and also to facilitate storage of flies 21 by hook means 22 as shown in FIG. 2 of the drawing.

A central or innermost pail 23 is provided with a line guide curvate spout 24 integrally formed with and disposed upwardly from the top edge 25 of the wall 26 of pail 23, which latter is employed to store a spool 27 of fishing line 28 which is normally threaded upwardly through spout 24 and retained in a reverse bend as at 29 by a resilient band or detent 30 for convenient retrieval for use.

It will be understood that the three pails may be formed with an upper edge of greater circumference than that at the bottom periphery for compact nesting of the separate pails for shipment, or one or more of the composite assembly may be formed with a straight cylindrical wall structure.

Having thus described the invention, what is claimed and desired to be secured by Letters Patent of the United States, is:

1. A composite fishing tackle pail comprising a base pail, a bail thereon for carrying the assembly, an intermediate pail having a horizontal row of apertures adapted to receive fish hooks integral with fishing lures and flies for storing the same, and an innermost pail held freely within the intermediate pail as a container for a spool of fishing line, and a combination spout and curvate handle based on and integral with the upper edge of said innermost pail, and releasable means for securing the free end of the fishing line normally protruding from the upper end of said spout.

2. An assembly as in claim 1, and a plurality of vertically spaced horizontal rows of hook receiving apertures in the wall of the intermediate pail.

3. An assembly as in claim 1, and a bail on said intermediate pail for lifting and replacing the same for retrieving and returning the attached fish lures and flies.

4. An assembly as in claim 1, and at least one of said pails formed as a cylinder.

5. An assembly as in claim 1, the wall of at least one of said pails frustro-conical to permit compact nesting thereof.

* * * * *